United States Patent
Vertes

(10) Patent No.: US 7,506,316 B2
(45) Date of Patent: Mar. 17, 2009

(54) METHOD AND SYSTEM FOR MANAGING SHARED-LIBRARY EXECUTABLES

(75) Inventor: Marc Philippe Vertes, Plaisance du Touch (FR)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/470,995

(22) PCT Filed: Feb. 1, 2002

(86) PCT No.: PCT/FR02/00398

§ 371 (c)(1),
(2), (4) Date: Jan. 16, 2004

(87) PCT Pub. No.: WO02/061579

PCT Pub. Date: Aug. 8, 2002

(65) Prior Publication Data

US 2004/0111720 A1    Jun. 10, 2004

(30) Foreign Application Priority Data

Feb. 1, 2001    (FR)    ................................. 01 01378

(51) Int. Cl.
*G06F 9/44*    (2006.01)
(52) U.S. Cl. .................................................... 717/130
(58) Field of Classification Search ................. 717/130, 717/154–158, 163–164
See application file for complete search history.

(56) References Cited

U.S. PATENT DOCUMENTS 5,175,828 A    12/1992    Hall et al.

(Continued)

FOREIGN PATENT DOCUMENTS

EP    0 908 817    4/1999

(Continued)

OTHER PUBLICATIONS

Segal M: "On-The-Fly Program Modification: Systems for Dynamic Updating" IEEE Software, IEEE Computer Society, Los Alamitos, US, vol. 10, No. 2, Mar. 1993, pp. 53-65, XP000913803 ISSN: 0740-7459, p. 60, section "Dynamic Modification System".

(Continued)

*Primary Examiner*—Wei Y Zhen
*Assistant Examiner*—Anna Deng
(74) *Attorney, Agent, or Firm*—Yee & Associates, P.C.; Matthew W. Baca

(57) ABSTRACT

A method and system for non-intrusively modifying an executable file E comprising references (F1, F2 and F3) with functions disposed in at least one shared library B within a computer. At least two new files are created, a META file comprising several unresolved references in executable file E and a services file comprising new functions or services to be inserted in executable file E. The link editing phase assigns the unresolved references to the META file as a priority and subsequently to shared library B. When the references are listed in the META file, a link is then established for the reference between executable file E and the META file in the place of shared library B. The META file may then assign one or more functions stored in service file S and/or in shared library B to the reference.

15 Claims, 4 Drawing Sheets

U.S. PATENT DOCUMENTS

| | | | |
|---|---|---|---|
| 5,481,706 A * | 1/1996 | Peek | 710/200 |
| 5,495,612 A | 2/1996 | Hirayama et al. | |
| 5,546,586 A | 8/1996 | Wetmore et al. | |
| 5,708,811 A * | 1/1998 | Arendt et al. | 717/163 |
| 6,154,878 A * | 11/2000 | Saboff | 717/173 |
| 6,219,825 B1 * | 4/2001 | Burch et al. | 717/158 |
| 6,351,843 B1 * | 2/2002 | Berkley et al. | 717/128 |
| 6,665,735 B1 * | 12/2003 | Tanaka et al. | 717/163 |
| 7,171,674 B2 * | 1/2007 | Arrouye et al. | 719/331 |
| 2002/0174161 A1 * | 11/2002 | Scheetz et al. | 709/100 |

FOREIGN PATENT DOCUMENTS

| | | |
|---|---|---|
| JP | 01-307825 | 12/1989 |
| JP | 04243424 | 8/1992 |

OTHER PUBLICATIONS

Hunt G et al:, "Detours: Binary Interception of WIN32 Functions" Technical Report MSR-TR-98-33, en ligne!, Feb. 1999, XP002146206, p. 2-p. 3, section 2.1 "Interception of Binary Functions" p. 5-p. 6, section 4. "Evaluation".

* cited by examiner

METHOD AND SYSTEM FOR MANAGING SHARED-LIBRARY EXECUTABLES

The present invention relates to a method and system of managing executable files using shared libraries.

To avoid high-capacity executable files, all the functions common to these executable files are generally pooled in a separate file. This separate file or shared library is usually integrated in the operating systems. For example, the object codes defining a function are no longer integrated in the executable files and instead, only the reference to this function is listed in the executable files.

An executable file using at least one shared library, or a dynamically executable file, therefore retrieves commonly used functions from the shared library. Whenever it is desirable to modify even a minor part of the executable file, it is necessary to modify the entire source code of the executable file, after which a compilation phase for this source code has to be re-run. However, the source code of an executable file is not always available.

The objective of the invention is to enable the behaviour of an executable file to be dynamically and non-intrusively modified, i.e. without making any physical modification to the executable file and any libraries it might share.

Another objective of the present invention is to extend, dynamically and non-intrusively, the capacities of existing executable files whilst they are being executed.

The above objectives are achieved by means of a method of non-intrusively modifying an executable file containing references to functions located in at least one shared library within a computer. For the purposes of the invention, in respect of a reference file, in the executable file, calling up a given function of the shared library, a reference file is accessed and acts as a link between the executable file and the location where said given function is actually located, the address of this given function being contained in this reference file, and this address is replaced by a new address pointing to another function so that calling up said function will enable this other function to be run whilst the executable file is being run.

The invention operates by acting on a reference file containing addresses of functions, to enable these addresses to be modified, thereby providing the executable file with a new object code without altering the executable file.

In a first mode of implementing the invention:
- at launching the executable file, a reference file is pre-loaded, which contains a plurality of references to new functions located in a services file,
- during the dynamic link editing phase which takes place whilst the executable file is being launched, for each unresolved reference contained in the executable file, said reference is assigned to the reference file as a matter of priority in so far as this reference is defined in said reference file, otherwise said reference is assigned to the shared library,
- whilst the executable file is being run, calling up a function for which a reference exists in the reference file enables a new function located in the services file to be executed instead of executing the function that was actually called up and the access route to this new function is defined in the reference file.

A reference is considered unresolved if the object code of the function to which it refers is not included in the executable file.

A services file is a file containing new services or functions which are to be attached to the executable file. The reference file contains some of the references which exist in the executable file. Conventionally, the purpose of these references is to execute functions contained in the shared library. With the method proposed by the invention, however, before establishing the link between each reference of the executable file and a corresponding function in the shared library, a check is firstly run to establish whether this function is listed in the reference file. If such is the case, the reference file intercepts this corresponding function, so to speak, and a link is then established between this reference and the reference file. Otherwise, i.e. the function is not listed in this reference file, a dynamic link is established between the executable file and the corresponding function in the shared library in the conventional manner.

Whenever a function is intercepted, the reference file contains a reference to this function and one or more new functions are assigned to this reference. In other words, each reference in the reference file is associated with an access route to a new function. This new function may be a function (or service) contained in the services file. Furthermore, the access route defined in the reference file may also enable a function from the shared library to be executed. The fact of intercepting a function therefore enables this original function to be substituted either by new functions or by a combination of functions, which may or may not include the original function stored in the shared library.

In one particular implementing mode, when a referenced function is called up from the reference file for the first time, a new phase is run during which links between the references contained in the reference file and functions linked to these references are dynamically edited. This new phase of dynamic link editing may be run using shared library manipulation routines.

Advantageously, the reference file and the services file can therefore be managed in the form of shared libraries.

In one mode of implementing the invention, whilst the executable file is being run, the access routes in the reference file are controlled and modified by means of a control channel.

The control channel may also be used to control the functions contained in the services file.

The executable files can then be altered without having to regenerate them. Services may be inserted, deleted or modified during execution.

The reference file uses the dynamic link editing functions of the computer's operating system to modify the executable files and activate or deactivate services.

In the existing art, the dynamic link editing process is normally activated exclusively when the executable file is loaded, before it is launched. With the method proposed by the invention, this process can be accessed at any time during execution of the executable file.

The reference file is reusable, so to speak, because a same function can be altered by several services, the execution command for these services being defined by this reference file.

By virtue of another aspect of the invention, a system is proposed by which an executable file containing references to functions located in at least one shared library within a computer can be non-intrusively modified. This system advantageously comprises:
- a services file containing a plurality of functions intended to be dynamically inserted in the executable file during an execution phase of this executable file,
- a reference file containing a plurality of references to functions located in said services file and in the shared library, and control means for monitoring and controlling the services file and the reference file.

In a second mode of implementing the invention, the objective is to manage a shared library, which has a local pseudo-function capable of simulating the presence of a function in the shared library, this pseudo-function in fact pointing to an address located in a rerouting table. Certain steps of the method are implemented by a management module. To this end, the reference file is the rerouting table and when the management module has been loaded:

the following are determined within the executable file: the list of dynamic objects and their respective loading addresses; for each dynamic object, the list of imported external functions and the list of exported functions; and whilst the executable file is being run, the address of a given function in the rerouting table is modified so that a function corresponding to the new address can be run when said given function is next called up.

This second mode enables operation with a table of pre-existing addresses. In effect, shared libraries containing exported functions have a rerouting table and in the prior art these tables are static. When the rerouting table is edited, the call-up graph is modified.

All the modifications made to the rerouting table can advantageously be stored in memory, thereby rendering the editing process reversible.

The management module preferably has a command language and the rerouting table can be dynamically edited.

To load the management module into the executable file, the management module can be pre-loaded in the form of a shared library when the executable file is launched. Alternatively, the executable file may also be interrupted by means of a supervision module during execution, this supervision module being external to the executable file and programmed to control the management module; an interrupt is inserted in the executable file at the current instruction; and the management module is loaded into the executable file. The management module is processed in the same way as a shared library.

As a result of one advantageous feature of the invention, commands for editing the rerouting table are transmitted to the management module by means of the supervision module, which has means for calling up the management module.

With this second mode, the new functions do not have to be pre-determined. They may be located in a service file on a predefined basis, or they may be created whilst the executable file is being run.

For the purposes of the invention, the management module may be removed from the executable file during execution with the aid of release means contained in the supervision module.

In a third implementing mode, the computer's operating system instantly loads a new shared library containing exported functions during execution, the addresses of these exported functions being stored in arbitrary local variables of the executable file, and the reference file is inserted between the local variables and exported functions likely to be called up by the executable file, the reference file by default containing the addresses of these exported functions. The reference file is set up so that it can be modified by means of a management module. This reference file is therefore placed in a location which can be accessed by the management module but not by the local variables.

Other advantages and features of the invention will become clear from the detailed description of an implementing mode, although this is not intended to be restrictive in any way, and from the appended drawings, in which.

Figure 1:
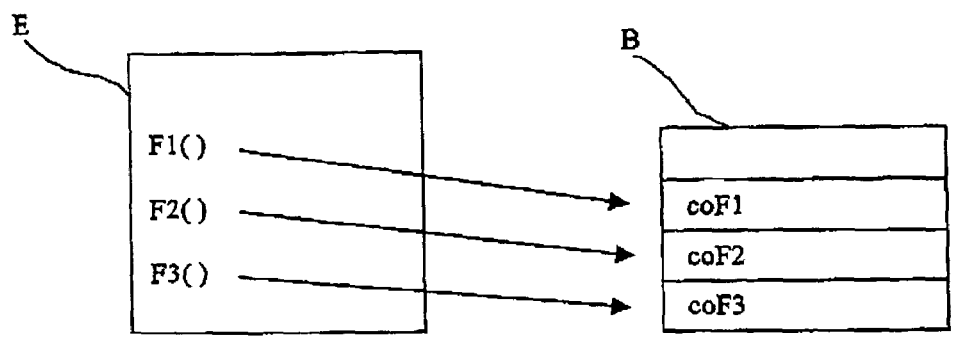
FIG. 1 is a simplified diagram illustrating the physical organisation of an executable file using a shared library, as known from the prior art.

FIG. 1 illustrates how a dynamic executable file E using a shared library B is organised on the basis of the prior art. The executable file E is a programme in the form of object code, in which symbols F1, F2 and F3 are specified. These symbols are references to commonly used functions F1, F2 and F3, the object codes coF1, coF2 and coF3 of which are stored in the shared library B. This library is a separate file and is not concatenated with the programme E. Before initial instructions coded in the programme E are executed, a phase is run resolving the references to the symbols whenever the programme E is loaded into the memory by a start-up programme (or boot loader). This reference resolution phase forms part of a link editing phase, the purpose of which is to link each reference F1 of the programme E to its object code stored in the library B.

Figure 2:
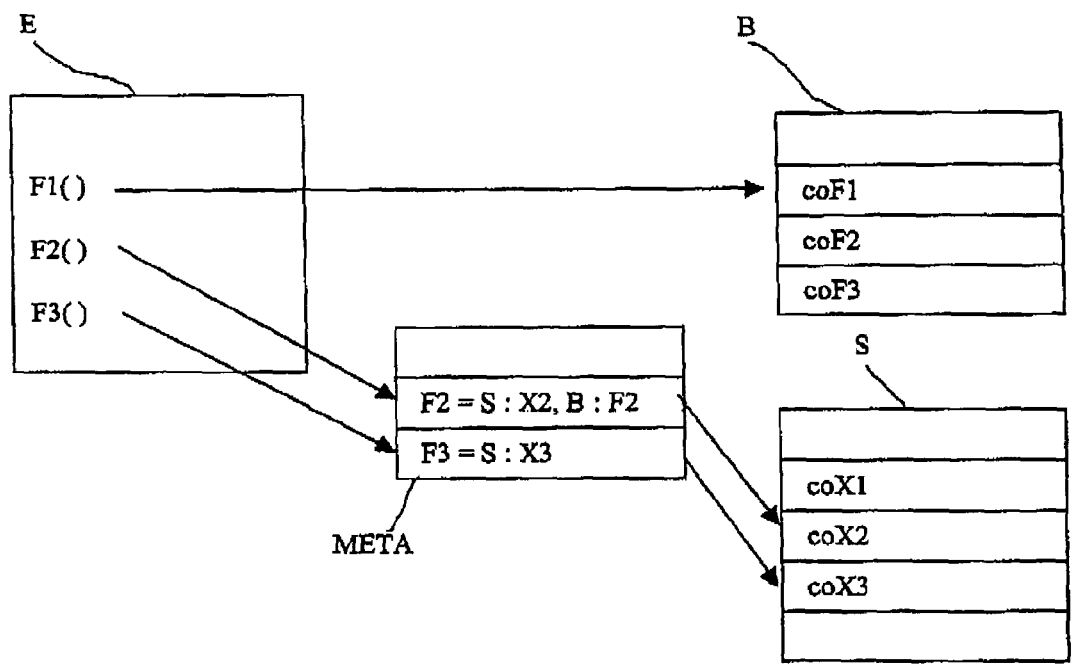
FIG. 2 is a simplified diagram illustrating the physical organisation of an executable file using several shared libraries as proposed by the present invention.
Figure 3:
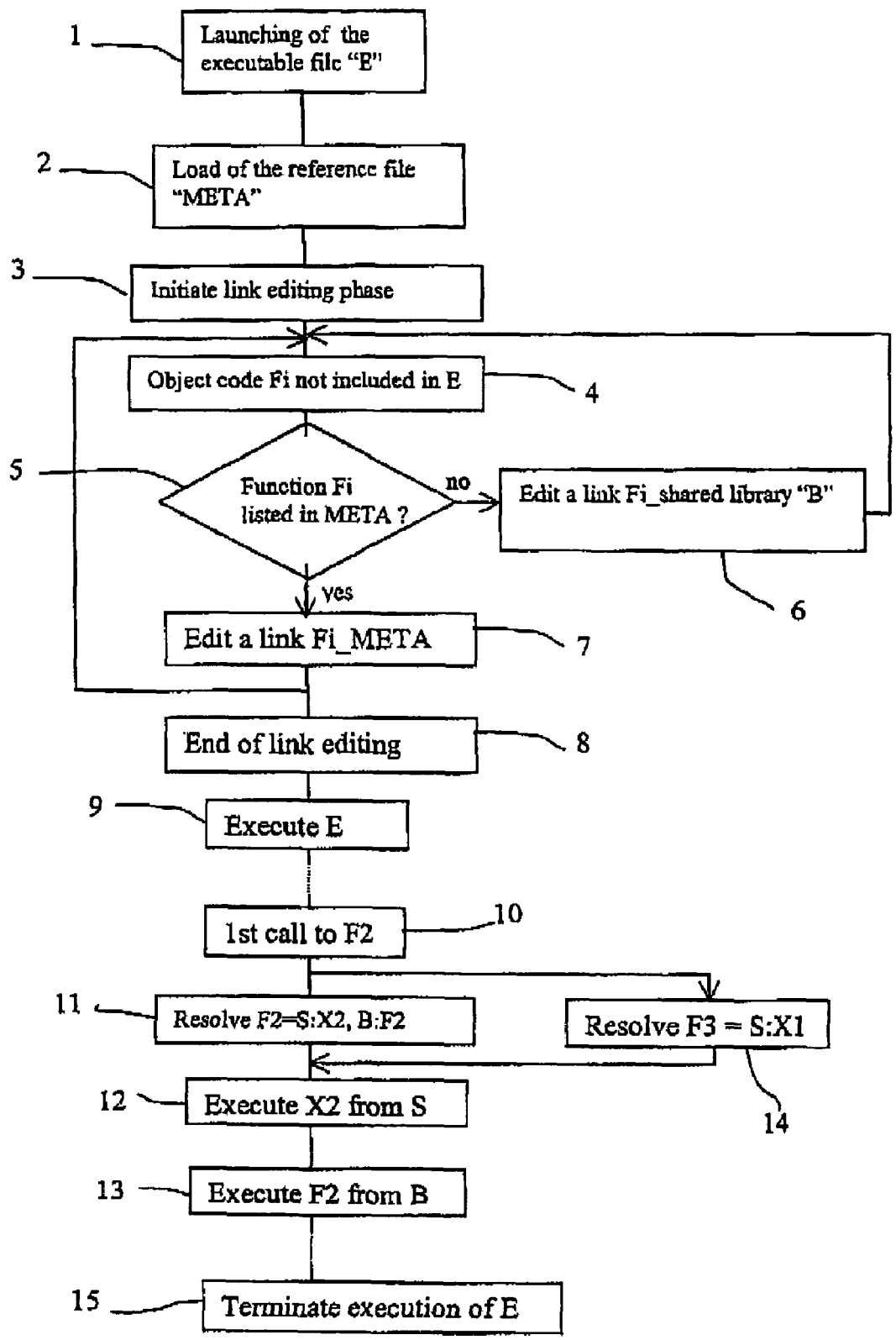
FIG. 3 is a flow chart illustrating different steps of a method proposed by the invention.

FIG. 2 illustrates a system as proposed by the invention, which incorporates the elements shown in FIG. 1. FIG. 3 describes different steps of a method proposed by the invention.

An implementing mode of the invention will now be described with reference to FIGS. 2 and 3.

As may be seen from FIG. 2, there are two new files that are not shown in FIG. 1. There is a META reference file, which is a specific shared library containing the references F2 and F3. There is also a services file S, which is a specific shared library containing object codes coX1, coX2 and coX3 of new functions or services X1, X2 and X3. The intention is to modify the way programme E is run by integrating several new functions Xi without at the same time physically modifying the executable file E and the library B.

In the META file, each reference is assigned an equation such that:

F2=S:X2, B:F2 and

F3=S:X3.

The equation associated with F2 means that instead of running function F2, function X2 stored in file S will be run, after which function F2 stored in the shared library B will be run.

The equation associated with F3 means that execution of function F3 will be replaced by execution of function X3 stored in file S.

At launching of the programme E at step 1, the operating system within which the invention is operated is instructed to pre-load the META file at step 2 before executing the first instructions coded in E. In the LINUX system, for example, this is obtained by positioning the environment variable "LD_PRELOAD".

The dynamic link editing phase run by the start-up programme (boot loader) is then initiated at step 3. Step 4 shows all the functions for which the file E does not contain the object code, i.e. the file E contains only their references or symbols, in which case the symbols are unresolved, so to speak. In FIG. 2, these references are F1, F2 and F3. As a matter of priority, they are assigned to the META file so that in step 5, a check is run first of all to check whether they are listed in the META file. Only references F2 and F3 are listed in the META file. This being the case, a link between references F1 and F2 of the executable file E and references F1 and F2 of the META reference file is edited at step 7. If, on the other hand, a function is not listed in the META file, as is the case with function F1, a link between reference F1 of the executable file E and the object code coF1 of function F1 is edited at step 6, this object code coF1 being stored in the shared library B.

Once the link editing phase has been terminated at step 8, the actual execution of the file E is initiated at step 9. As E is being executed, initialisation of the META file is triggered the first time one of the intercepted functions is called up, F2 in this particular instance, at step 10. This initialisation consists in completing the link editing phase which took place between step 3 and 8. The routines used to manipulate the shared libraries for this purpose are the same as those used by the start-up programme. In respect of the two functions F1 and F2, the following are resolved:

the reference of each function in META indicating the service to be inserted. In FIG. 2, F2 in the META file must point to X2 in the services file S; F3 in the META file must point to X3 in the services file S; in the absence of a service to be inserted, the function is redirected to its original library B;

optionally, in the services file S, the reference or references indicating prerequisite functions. In FIG. 2, for example, function x2 in S refers back to function F2 in B. This action is very important because it enables a linked chain of services to be established and allows incremental services to be developed.

This initialisation phase is run at steps 11 and 14. Following this initialisation of META, the call-up graph between the functions is then established, after which function X2 is run at step 12 followed by function F2 at step 13.

The capacity to redefine the function call-up graph enabling services to be inserted in the form of a shared library becomes available when the programme E is launched but these services can also be activated at any time whilst this programme E is running, in particular by means of a control channel in the META file. A number of strategies may be used to initiate opening of this channel: when functions are intercepted in META, prompted by a signal, etc.

By way of example, the META file may be used to specify a call system in the following manner:

"

extern int open(const char *pathname, int flags, mode_t mode)

```
{
if (traceon && tracefile)
    fprintf(tracefile, "trace%s: %d: open(\"%s\", %o, %o)\n",
        INDEX, pid, pathname, flags, mode);
Return (*meta_open) (pathname, flags, mode)); }
"
```

In the example above, the line shown in bold type denotes the call to the subjacent "open" function. The variable "meta_open" is a pointer to the original function or a routine implementing another service in an identical manner. This function, for example X2 defined in S, may be loaded by META for a plurality of executable files without having to modify them.

The META file is independent of the edited programmes and of the services performed. Each service, in the form of a shared library, supplies the META file with the following data:

the list of functions which the META file must intercept, together with the link to the internal function to be called, for example in FIG. 2, the call to function F2 in E must trigger function X2 in S;

the list of prerequisite external functions (which can therefore be intercepted) for implementing the service, this being the information which enables the META file to set up the links between services and functions;

the definition of each of the substitute functions to be activated on interception as well as various new functions; and the list of new functions exported by the service, which the subjacent services may use; for example, META exports functions which open the control channel so that the other services can use them without having to re-implement them.

The present invention offers an alternative method, which provides a simple means of dealing with general problems, such as tolerance to failure by applications, migration of applications and external control of the inputs-outputs. It enables executable files to be mutated non-intrusively. For example, in an executable file in a system as proposed by the invention, the functions which can be altered are those which are defined in dynamically loadable shared libraries, whether they be call-up systems or other types of functions (mathematical, . . . ).

The method proposed by the invention uses the dynamic link editing functions of the operating system so that it can non-intrusively manipulate executable files and activate/deactivate services, themselves in the form of shared libraries. The dynamic link editing functions can advantageously be accessed at any time whilst the executable file is being run. Finally, the META reference file is reusable because a same function can be altered by several services. It would also be conceivable to set up several reference files of the META type and several services files S.

Figure 4:
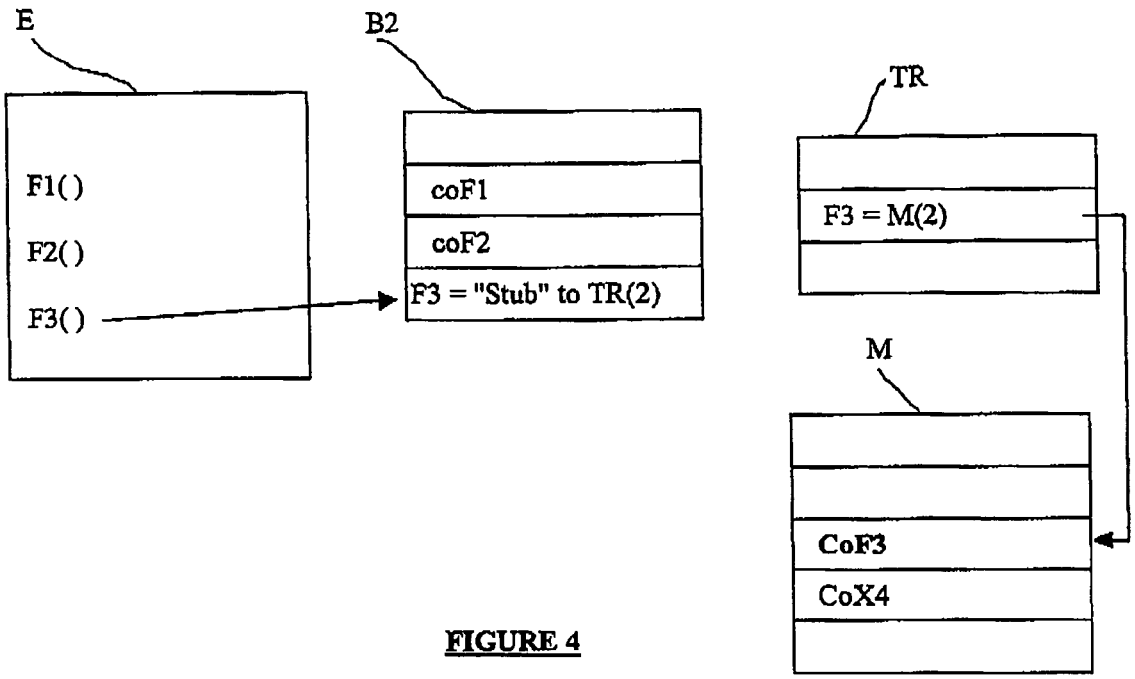
FIG. 4 is a simplified diagram illustrating the physical organisation of an executable file using a shared library, with a means of re-direction to exported functions.
Figure 5:
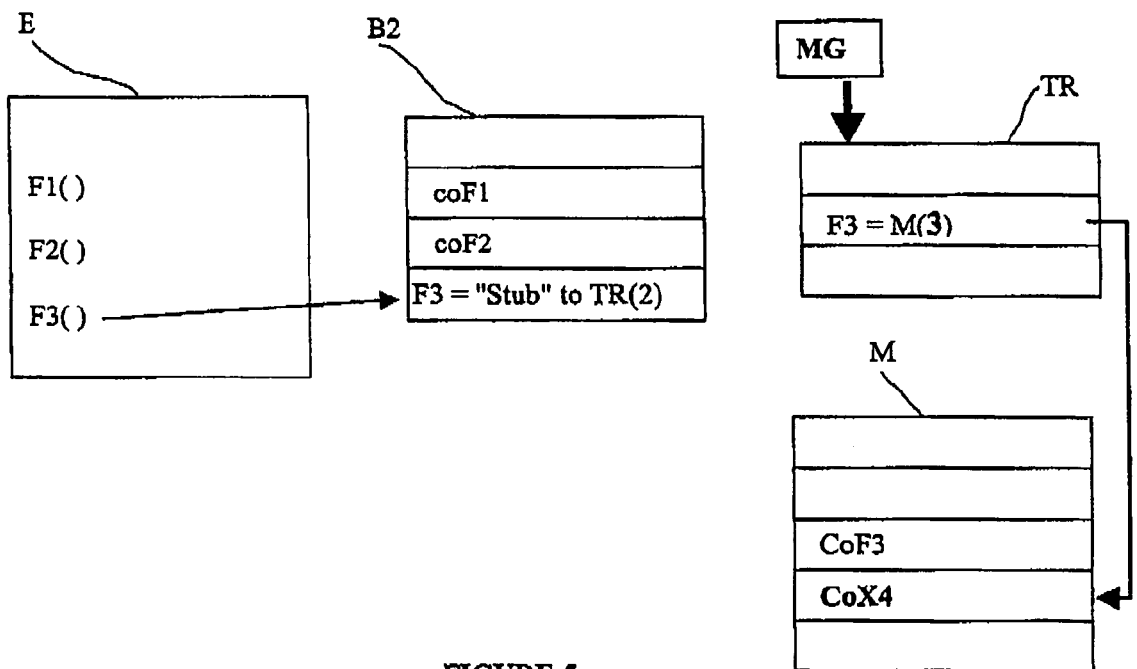
FIG. 5 illustrates the elements of FIG. 4 in the situation where an exported function has been replaced using the second implementing mode proposed by the present invention.

The executable file E may also be seen in FIG. 4. The library B2 is set up so that it does not contain the object code for function F3 and instead contains an application or pseudo-function called "Stub", enabling the presence of this function F3 to be simulated in response to the executable file E. In reality, the "Stub" application points to an address TR(2) located in a rerouting table TR, which in turn points to an address M(2) at a location M where the object code coF3 for function F3 is in fact located. What is remarkable is that the rerouting table TR can be accessed by any module that is external to the executable file. The invention uses a management module MG, which is an intelligent agent or application with the ability to modify the addresses contained in the rerouting table. Via the management module MG, illustrated in FIG. 5, address M(2) in the rerouting table is replaced by the address M(3). Meanwhile, M(3) contains an object code coX4 for a new function X4. Accordingly, when the executable file calls up function F3, it is the object code coX4 of function X4 that will be processed. The management module also has means for memorising this replacement, thereby enabling the initial status to be restored, i.e. M(2) in the rerouting table TR.

The management module operates in conjunction with a supervision module, which enables commands from a user to be received and interpreted in a language that is understandable to the management module, after which these commands are activated.

In other words, the second mode of implementing the invention involves an executable file or programme in which a function is called, the definition of which is stored in an external shared library. For every function external to a dynamic object (programme or shared library) which is explicitly used by the dynamic object, there exists a pseudo-function local to the object (called a "stub"), which is generated during the preliminary link editing phase run by the link editing programme (LD in LINUX). As far as the shared library is concerned, the purpose of the "stub" is to mask the fact that the object code of the function is in reality not local to the library. Furthermore, this object code may be located at an address that is unknown at the time when the shared library was generated. When the programme is executed, this pseudo-function retrieves the real object code by establishing an access route to this object code. This access route is established at the time the dynamic links are edited and is so by storing the address of the object code in a zone called rerouting table, located in the DATA segment of the dynamic object. Advantageously, this DATA segment can be modified.

The second implementing mode of the method consists in being able to edit the address of an external function in the rerouting table of the shared library during a later phase of dynamic link editing and to do so in an arbitrary manner whilst the programme is running. To this end, the definition of one function is substituted by another. An interesting feature of this method is that it enables the reference to a function to be edited, even if the programme has been interrupted during execution. In effect, because the functions themselves are not modified, but only their location address, the preceding occurrence of the function will terminate its run normally and the modification will not take effect until the next time the function is called up.

The management module proposed by the invention contains the following functions in particular:
  an introspection function, capable of determining the following once loaded into a programme:
    the list of dynamic objects of this programme (partially executable and shared libraries) as well as the respective addresses at which they have been loaded,
    for each dynamic object, the list of imported external functions, i.e. for which an entry exists in the rerouting table, which is likely to be modified subsequently,
    for each dynamic object, the list of exported functions, i.e. the definition address of which might appear in a rerouting table of another dynamic object of the same programme,
  an editing function for the rerouting table, which is capable, firstly, of modifying the address of a function external to the library and, secondly, memorising the successive up-dates in order to be able to delete them if necessary, and secure complete reversibility of the system,
  a module loading function, which consists in inserting a control channel enabling it to be loaded from a supervision module and then activated, on the basis of the following methods:
    either on booting the programme by pre-loading the management module, itself in the form of a shared library,
    or whilst the programme running, by interrupting the programme, inserting an interrupt in the programme at the current instruction via the operating system and loading the management module,
  a module releasing function, enabling the module to be removed from the programme whilst it is running.

Alternatively, there is another possibility of calling up external functions for dynamic programmes: whilst it is being run, the programme can access functions supplied by the operating system, enabling a new shared library ("DLOPEN" in LINUX) to be loaded on the fly (during execution), and then access exported functions through this library by obtaining their addresses ("DLSYM" function in LINUX) and storing them directly in the arbitrary local variables rather than in the rerouting table, as described above. A priori, these local variables are unknown to and inaccessible from an external module.

Figure 6:
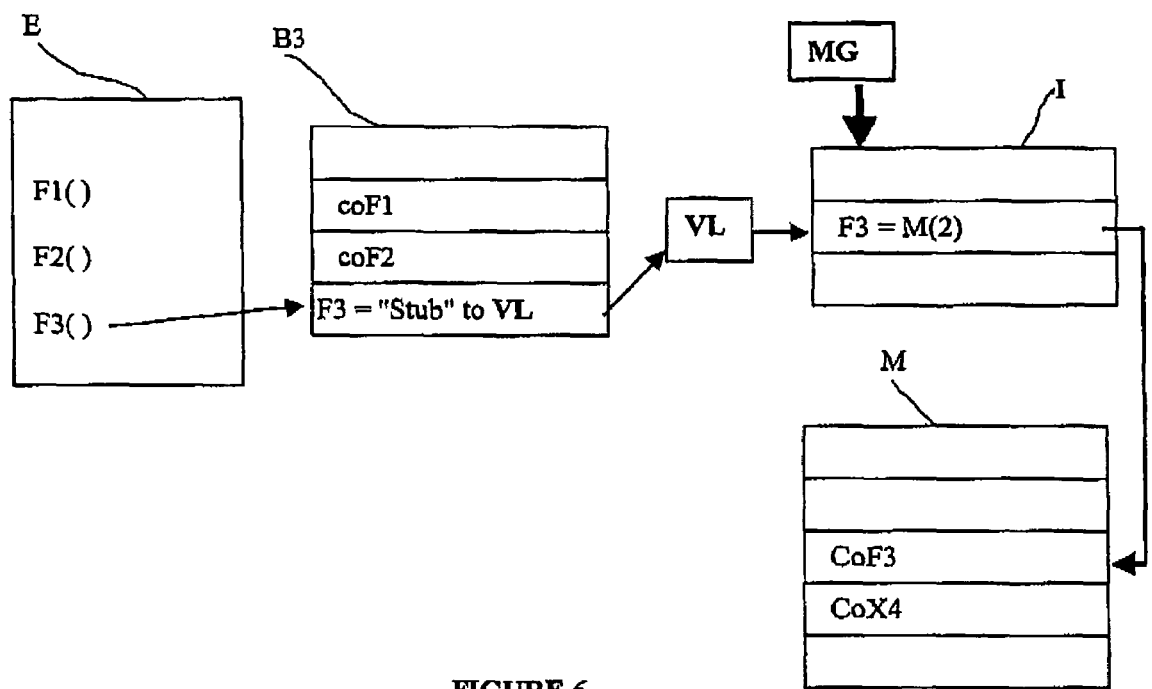
FIG. 6 is a simplified diagram illustrating a third approach to implementing the invention in the situation where a shared library is loaded by the computer's operating system during execution.

FIG. 6 shows a shared library B3, which is a library loaded by the operating system. In the prior art, the addresses of exported functions are normally located in local variables VL and these local variables are not available.

In the case of the invention, taking an application ("DLSYM" function in LINUX) of the operating system as an example, this application normally allows access to the address M(2) of the object code for the exported function F3 from the shared library B3. This application is then edited so that it no longer returns the address M(2) of the object code for the function F3, but the address of an interposition table I generated by the management module MG. This interposition table (inserted at the address corresponding to F3) points by default to the object code coF3 of the exported function F3 in M. The advantage is that the interposition table can be modified via the management module MG.

The method proposed by the invention is applied to a target application, where it may be desirable to be able to modify operation dynamically. In these second and third modes, this method particularly makes use of the following elements for its implementation:
  a management module in the form of a shared library, using a command language that will enable the call-up graph for functions to be dynamically edited. These commands might be, for example: "replace function1 defined in library 1 with function2 defined in library 2"; "delete replacement"; "list replaced functions"; "list new functions"; . . . Following a replacement command, for example, every call to function1 will in effect call up function2 instead of and in the place of function1. These changes continue to apply until the end of the programme. They are not permanent and a programme can therefore be re-booted in its default configuration.
  a supervision module in the form of an external programme, enabling:
    the management module to be loaded into a programme during execution by inserting an interrupt and calling up the load function of the management module in the form of a shared library: "dlopen("mg.so")" in LINUX; the implementing technique is similar to that used by debuggers;
    a dialogue with the programme (executable file) via a control channel in order to manipulate the call-up graph of this programme; the commands may be activated by a graphical interface or by a command string or alternatively by functions contained in any other programmes;

aside from the ability to edit the call-up graph, the external programme is not absolutely necessary to the smooth-running of the application.

Although these examples are not intended to be restrictive, the present invention may be implemented in the following applications:

Dynamic instrumentation, which is reversible, in information systems used to measure performance by inserting measuring probes during test campaigns. In principle, these operations are impossible using existing instrumentation techniques, which are irreversible, and whose cost of operation is not compatible with this type of operational deployment.

Upgrading and corrective programme maintenance during operation, where a function is dynamically replaced by a new version to correct bugs or introduce new functions. The techniques used today require programmes to be completely shut down, replaced and restarted.

Non-intrusive implementation of system functions both for applications and for the operating system, for example by substituting system functions capable of redirecting processing to another machine in the event of failure. Current techniques do not allow such changes without intervening at the very heart of the system or without rewriting specific applications.

Non-intrusive integration of heterogeneous applications by developing connectors and conversion filters, which can be expediently inserted on existing interfaces by substitution without rewriting the application.

Clearly, the invention is not limited to the examples described above and any number of variations can be made to these examples without departing from the scope of the invention.

The invention claimed is:

1. A method of non-intrusively modifying behavior of an executable file containing references to functions located in at least one shared library within a computer without modifying the at least one shared library, comprising:

calling, by the executable file, a given function of the at least one shared library;

accessing a reference file that links between the executable file and a location where the given function is located, wherein an address of the given function is contained in the reference file;

replacing the address with a new address pointing to another function that is located in a services file such that calling of the given function will enable the another function to be run in response to the executable file being run; and responsive to the another function completing, calling the given function such that both the another function and the given function are run in response to the executable file being run, wherein the services file is a new shared library containing exported functions, wherein the computer's operating system loads the new shared library during execution, addresses of the exported functions are stored in local variables of the executable file, wherein the reference file is inserted between the local variables and the exported functions that are operable to be called up by the executable file, the reference file containing the addresses of the exported functions, wherein the reference file is modified by a shared library management module.

2. A method of non-intrusively modifying behavior of an executable file containing references to functions located in at least one shared library within a computer without modifying the at least one shared library, comprising:

calling, by the executable file, a given function of the at least one shared library;

accessing a reference file that links between the executable file and a location where the given function is located, wherein an address of the given function is contained in the reference file;

replacing the address with a new address pointing to another function that is located in a services file such that calling of the given function will enable the another function to be run in response to the executable file being run;

responsive to the another function completing, calling the given function such that both the another function and the given function are run in response to the executable file being run;

responsive to launching the executable file, pre-loading a reference file containing a plurality of references to new functions located in a services file, during a dynamic link editing phase which takes place while the executable file is being launched, and for each unresolved reference contained in the executable file, assigning said unresolved reference to the reference file, and for each resolved reference contained in the executable file, assigning said resolved reference to the at least one shared library, while the executable file is running, calling up a function for which a reference exists in the reference file such that a new function located in the services file is enabled to be executed instead of executing the function that was actually called up, wherein an access route to the new function is defined in the reference file.

3. The method of claim 2, wherein the access route defined in the reference file also enables the given function of the at least one shared library to be executed.

4. The method of claim 2, wherein when a reference function is called up from the reference file for a first time, another dynamic link editing phase is run during which links between reference file references contained in the reference file and functions linked to the reference file references are dynamically edited.

5. The method of claim 4, wherein the another dynamic link editing phase is run using shared library manipulation routines.

6. The method of claim 2, wherein the reference file and the services file are managed in the form of shared libraries to facilitate modifying the behavior of the executable file without modifying the at least one shared library.

7. The method of claim 2, wherein while the executable file is running, access routes in the reference file are controlled and modified by a control channel.

8. The method of claim 7, wherein the control channel monitors functions contained in the services file.

9. A method of non-intrusively modifying behavior of an executable file containing references to functions located in at least one shared library within a computer without modifying the at least one shared library, comprising:

calling, by the executable file, a given function of the at least one shared library;

accessing a reference file that links between the executable file and a location where the given function is located, wherein an address of the given function is contained in the reference file; and replacing the address with a new address pointing to another function such that calling of the given function will enable the another function to be run in response to the executable file being run; and responsive to the another function completing, calling the given function such that both the another function and the given function are run in response to the executable file being run, wherein the method is implemented by a shared library management module, wherein the shared library management module has a local pseudo-function for simulating a function in the at least one shared library, wherein said pseudo-function points to an address located in a rerouting table, wherein the reference file is the rerouting table and, responsive to the shared library management module being loaded into the executable file during running of the executable file:
determining within the executable file a list of dynamic objects and their respective loading addresses;
determining, for each dynamic object in the list of dynamic objects, a list of imported external files and a list of exported functions; and
modifying, while the executable file is running, an address of a given function in the rerouting table so that a function corresponding to the new address can be run when said given function is next called up to facilitate modifying the behavior of the executable file without modifying the at least one shared library.

10. The method of claim 9, wherein all modifications made to the rerouting table are stored in memory.

11. The method of claim 9, wherein the shared library management module has a command language and the rerouting table is dynamically modified.

12. The method of claim 9, further comprising preloading the shared library management module as another shared library when the executable file is launched in order to load the shared library management module into the executable file.

13. The method of claim 9, wherein loading the shared library management module into the executable file comprises:
interrupting the executable file by means of a supervision module, the supervision module being external to the executable file and programmed to control the shared library management module,
inserting an interrupt in the executable file at a current instruction of the executable file, and
loading the shared library management module into the executable file.

14. The method of claim 13, wherein commands for editing the rerouting table are transmitted to the shared library management module by means of the supervision module, wherein the supervision module comprises means for calling up the shared library management module.

15. The method of claim 13, wherein the shared library management module is removed from the executable file during execution using a release means contained in the supervision module.

* * * * *